US011469696B2

(12) United States Patent
Andersson et al.

(10) Patent No.: US 11,469,696 B2
(45) Date of Patent: Oct. 11, 2022

(54) ALTERNATOR SYSTEM

(71) Applicant: Ningbo Geely Automobile Research & Development Co., Ltd., Ningbo (CN)

(72) Inventors: Jerker Andersson, Gothenburg (SE); Göran Svedoff, Västra Frölunda (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 333 days.

(21) Appl. No.: 16/807,607

(22) Filed: Mar. 3, 2020

(65) Prior Publication Data

US 2020/0204096 A1 Jun. 25, 2020

Related U.S. Application Data

(63) Continuation of application No. PCT/CN2018/105295, filed on Sep. 12, 2018.

(30) Foreign Application Priority Data

Sep. 13, 2017 (EP) .................................... 17190840

(51) Int. Cl.
*H02P 9/02* (2006.01)
*H02K 11/20* (2016.01)
(Continued)

(52) U.S. Cl.
CPC .............. *H02P 9/02* (2013.01); *B60R 16/033* (2013.01); *H02K 1/12* (2013.01); *H02K 1/22* (2013.01);
(Continued)

(58) Field of Classification Search
CPC ............ H02P 9/02; H02P 9/48; B60R 16/033; H02K 1/12; H02K 1/22; H02K 5/00;
(Continued)

(56) References Cited

U.S. PATENT DOCUMENTS 3,710,226 A 1/1973 Seike
5,087,869 A 2/1992 Kuriyama
(Continued)

FOREIGN PATENT DOCUMENTS

CN 101960713 A 1/2011
DE 4102076 A1 8/1991
(Continued)

OTHER PUBLICATIONS

Extended European Search Report from corresponding European Application No. 17190840.3, dated Mar. 8, 2018, 9 pages.
(Continued)

*Primary Examiner* — Jung Kim
(74) *Attorney, Agent, or Firm* — Tucker Ellis LLP

(57) ABSTRACT

An alternator system includes an alternator with a stator having at least one stationary winding and a rotor with a rotatable field coil for producing alternating current, a main voltage regulator having a main controller and a main power switch configured to control the current through the field coil, a redundant voltage regulator having a redundant controller and a redundant power switch configured to control the current through the field coil. The main power switch, the field coil and the redundant power switch are connected in series, in that order. A power supply for an electrical system includes a battery and the alternator system. A vehicle includes the power supply.

16 Claims, 2 Drawing Sheets

(51) Int. Cl.
  *H02K 11/33* (2016.01)
  *B60R 16/033* (2006.01)
  *H02K 1/12* (2006.01)
  *H02K 1/22* (2006.01)
  *H02K 5/00* (2006.01)

(52) U.S. Cl.
  CPC ............... *H02K 5/00* (2013.01); *H02K 11/20* (2016.01); *H02K 11/33* (2016.01)

(58) Field of Classification Search
  CPC ........ H02K 11/20; H02K 11/33; H02K 1/223; H02J 7/00308; H02J 7/0047; H02J 7/24; Y02T 10/70
  See application file for complete search history.

(56) References Cited

U.S. PATENT DOCUMENTS

| | | | |
|---|---|---|---|
| 6,294,899 B1 | 9/2001 | Tokugawa | |
| 7,498,776 B2 * | 3/2009 | Nishimura | H02P 9/305 322/28 |
| 8,080,980 B2 | 12/2011 | Harmon | |
| 2011/0050182 A1 | 3/2011 | Herz | |

FOREIGN PATENT DOCUMENTS

| | | |
|---|---|---|
| DE | 10012860 A1 | 3/2001 |
| DE | 102007033357 A1 | 1/2009 |
| EP | 1303023 A2 | 4/2003 |
| EP | 1675245 A2 | 6/2006 |
| EP | 1696554 A2 | 8/2006 |
| EP | 2883753 A1 | 6/2015 |

OTHER PUBLICATIONS

International Search Report and Written Opinion from corresponding Application No. PCT/CN2018/105295, dated Dec. 19, 2018, 9 pages.

International Preliminary Report on Patentability from corresponding Application No. PCT/CN2018/105295, dated Jan. 2, 2020, 16 pages.

* cited by examiner

ALTERNATOR SYSTEM

RELATED APPLICATION DATA

This application is a continuation of International Patent Application No. PCT/CN2018/105295, filed Sep. 12, 2018, which claims the benefit of European Patent Application No. 17190840.3, filed Sep. 13, 2017, the disclosures of which are incorporated herein by reference in their entireties.

TECHNICAL FIELD

The disclosure relates to an alternator system comprising an alternator with a stator having at least one stationary winding and a rotor with a rotatable field coil for producing alternating current. The disclosure also relates to a power supply for an electrical system comprising such an alternator system, as well as a vehicle comprising such as a power supply. The alternator system according to the disclosure can be applied for supplying electrical current in varies technical applications, such battery charging, and/or general power supply.

The alternator system according to the disclosure will herein be described with reference mainly to combustion engine vehicle with a 12 volt battery but the alternator system according to the disclosure can be used in many different applications, such as for example automobiles, heavy-duty vehicles such as trucks and buses and working machines, off-road vehicles, air flight machines, rail vehicles, marine vessels, motorcycles, and the like, as well as with many different voltage levels, such as for example 24 volt, 48 volt, etc.

BACKGROUND

In for example a combustion engine vehicle the electrical system has an alternator that is driven by the combustion engine and supplying current to the electrical components of the vehicle and to the battery of the vehicle for charging the battery. An alternator may also be referred to as an electrical generator and the dominating type of alternator in automobiles is today synchronous AC (Alternating Current) generator. Normally, even at high current consumption of all electrical components the alternator has enough supply capacity to simultaneously charge the battery.

Alternator systems typically comprise an alternator with a stator having at least one stationary winding and a rotor with a rotatable field coil. The current through the field coil, which also may be referred to as excited winding, can be regulated for controlling the output voltage of the alternator. A failure of the alternator system may consequently result in increased output voltage above a target output voltage. This type of failure may be referred to as overvoltage failure.

For handling overvoltage failures the alternator system is designed to limit the overvoltage to a predetermined maximal overvoltage level, in a worst case scenario, and to set an electrical component requirement stating that all electrical components in the vehicle must continue being fully operation for a predetermined time period while being supplied with the predetermined maximal overvoltage level.

For example, a worst case overvoltage failure in a conventional 12 volt alternator system may lead to an output voltage of about 18-20 volt. The electrical component requirement states then that all electrical components in the vehicle must continue being fully operation for example 60 minutes while being supplied with for example 18 volt.

The electrical component requirement may be different depending on the type function the electrical component is involved with. For example, the highest electrical component requirement may be relevant only for the highest category of function importance, e.g. vehicle like brakes, steering, headlights, and the like.

Overvoltage results in increased voltage drop over the electrical components and thereby increased power dissipation. The electrical components must thus be selected to handle the increased power dissipation generated by the maximal overvoltage level.

For example, for a linear electrical circuit the voltage drop increase is squared regarding power dissipation and the design must not exceed the maximum allowed temperature at maximal overvoltage level. In practice the power dissipation could increase up to several times. A linear 12 V output supply regulator has roughly a voltage drop of 4 V at 16 V supply and around 8 V at 20 V which means that the power dissipation is 4 times higher at 20 V. It is even worse if the linear regulator voltage output is lower.

For a switching regulator or output driver the power dissipation takes place at the switching transition itself and the power dissipation at 20 V of e.g. a FET transistor referred to 16 V is increased at least 60 to 150% depending of the FET type and gate driving circuits. Most power semiconductors in electrical applications, such as automobiles, must thus be designed to withstand a maximal overvoltage level of about 18-20 V and to handle the increased power dissipation. Heat sinks have to be added and must have sufficient cooling. This could increase the physical size and silicon area of the semiconductor device. Further the mechanical size and heat sinks are related to weight of the power component.

It is clear from above that providing an electrical system that is capable of handling overvoltage increases the cost for the electrical components and the effort for providing it, and the trend is that electronics applications in various applications, such as in particular vehicles, is rapidly growing in the near future.

Document EP 1 303 023 A2 discloses an energy supply for vehicles with redundant alternator regulation for avoiding overvoltage. However, while this solution works well in some situations, there is still room for performance improvements.

SUMMARY

A general object of the present disclosure is to provide a cost-efficient alternator system with further reduced risk for supplied overvoltage from alternator system. With sufficiently reduced risk for supplied overvoltage from the alternator system it may be possible to substantially lower the electrical component requirement, and thereby attaining significantly reduced cost for the electrical system.

This and other objects, which will become apparent in the following, are accomplished by an alternator system as defined in the accompanying independent claim. Details of some example embodiments and further optional features are recited in the associated dependent claims.

According to a first aspect of the present disclosure, there is provided an alternator system comprising an alternator with a stator having at least one stationary winding and a rotor with a rotatable field coil for producing alternating current, a main voltage regulator having a main controller and a main power switch configured to control the current through the field coil, a redundant voltage regulator having a redundant controller and a redundant power switch configured to control the current through the field coil, wherein the main power switch, the field coil and the redundant power switch are connected in series, in that order.

By providing the alternator system with a two individual voltage regulators, each having its own electronic controller and power switch, the robustness and reliability of the output voltage regulation of the alternator system is further enhanced. In particular, by providing a main and a redundant voltage regulator, each being fully operational on its own, single faults occurring within the main voltage regulator will not influence the functionality of the redundant voltage regulator, such that a more robust and reliable alternator system is accomplished.

For example, a software or hardware failure of the main controller will not necessarily influence the redundant voltage regulator. Moreover, by having two separate voltage regulators, i.e. the main and redundant voltage regulator, each voltage regulator may have individual electrical connections. For example, each voltage regulator may have an individual communication bus connection, power supply connection, output voltage sensing connection, regulator output connection, phase detection connection, ground connection, or the like. Thereby, failures related to conductors or electrical connections of said conductors associated with the main voltage regulator will not necessarily influence the functionality of the redundant regulator.

Moreover, by having the main power switch, the field coil and the redundant power switch connected in series, in that order, it is ensured that failure of an electrical connected between the main controller and main power switch will not negatively influence the functionality of the redundant voltage regulator.

Moreover, said series connection, in combination with separate and individual main and redundant voltage regulators, enables automatic switching to alternator output voltage regulation by means of the redundant voltage regulator in case of oversteering of the main power switch.

The main and redundant voltage regulators may be identical voltage regulators. They may further preferably be selected from standard regulators for reducing cost.

The voltage controller in EP 1 303 023 A2 comprises a single electrical controller 2 that controls both the first and second power switches TI, T2, wherein the single controller continuously monitors and compares the supply voltage of the alternator with the control signal to the first power switch TI. When the single controller detects of a failure by a plausibility check the single controller controls the second power switch to take over the voltage regulation. However, failure of the single controller software or hardware or failure of any of the critical electrical connections 2a, 2c, 2e, 21 will result in failure of the entire alternator system.

In one example embodiment, the redundant voltage regulator has an output voltage regulation set-point that is higher than a output voltage regulation set-point of the main voltage regulator. This configuration enables automatic takeover of the voltage regulation by means of the redundant voltage regulator in case of oversteering of the main power switch for any reason.

For example, when ignoring temporary voltage level adjustments for taking ambient temperature, battery state of charge, momentary electrical current consumption, etc. Into account, the main voltage regulator may have output voltage regulation set-point of 14.0 volt. By setting the output voltage regulation set-point of the redundant voltage regulator to for example 14.2 volt, the redundant controller will control the redundant power switch to continuously be in a fully conducting state as long as the main voltage regulator is fully operational and without failure, because the actual output voltage of the alternator system will be 14.0 volt which is lower than 14.2 volt. However, as soon as a failure occurs in the main voltage regulator resulting in an actual output voltage of the alternator system exceeding 14.2 volt, the redundant controller will automatically control the redundant power switch to restrict the current through the field coil, and thereby automatically reduce the actual output voltage of the alternator system to 14.2 volt. Both the main and redundant voltage regulators are thus configured to continuously and simultaneously control the current through the field coil but the redundant voltage regulator has an output voltage regulation set-point that is higher than an output voltage regulation set-point of the main voltage regulator.

The driver and/or a fleet management service and/or repair service center is preferably informed of the take-over of voltage regulation by the redundant voltage regulator.

In one example embodiment, the redundant voltage regulator has an output voltage regulation set-point that is in the range of 0.1-3.0 volt or 1-20%, specifically 0.1-1.0 volt or 1-7%, and more specifically 0.2-0.7 volt or 0.2-0.5% higher than an output voltage regulation set-point of the main voltage regulator.

In one example embodiment, both the main and redundant voltage regulators are configured for being in operation simultaneously in normal operation of the alternator system, wherein as long as the main voltage regulator is fully functional the redundant power switch is controlled to be in a fully conducting state because output voltage of the alternator system is lower than the predetermined output voltage regulation set-point of the redundant voltage regulator, and wherein the redundant voltage regulator automatically takes over control of the output voltage of the alternator system according to output voltage regulation set-point of the redundant voltage regulator when the main voltage regulator over-excites the field coil due to a failure. Automatic takeover of the voltage regulation is advantageous because the redundant voltage regulator is then not dependent on the functionality of an additional superordinate control signal that may itself become dysfunctional and thereby result in potentially damaging alternator system output overvoltage.

In one example embodiment, the redundant controller is configured to control the redundant power switch independent from the status or activity of the main controller or main power switch. Thereby increased level of autonomous voltage control is provided by the redundant controller, such that the risk for single failure causing output overvoltage is reduced.

In one example embodiment, an electrical ground connection of the main voltage regulator is separate and displaced from an electrical ground connection of the redundant voltage regulator. Having individual and separate electrical connections and electrical conductors the risk that a single electrical connection failure or single electrical conductor failure will cause failure of both the main and redundant voltage regulators.

In one example embodiment, a voltage terminal of the main voltage regulator is separate and displaced from a voltage terminal of the redundant voltage regulator. Having individual and separate electrical terminals and electrical conductors the risk that a single electrical connection failure or single electrical conductor failure will cause failure of both the main and redundant voltage regulators.

In one example embodiment, the voltage terminal of the redundant voltage regulator is located at, or within the same single-piece structural part as, a battery positive terminal of a housing of the alternator. The main voltage regulator typically detects and monitors the momentary voltage output by means of a sensing cable attached at a sensing location at the output of a rectifying circuit, or somewhere similar within the alternator. For avoiding the risk that a damaged or otherwise poor electrical connection between the sensing location and the main controller also influence the voltage control of the redundant voltage regulator it may be advantageous to place the voltage terminal of the redundant voltage regulator at, or within the same single-piece structural part as, a battery positive terminal of a housing of the alternator. Thereby, a single failure caused by a common failed electrical connection or common failed electrical conductor is avoided.

In one example embodiment, each of main and redundant voltage regulators comprises an individual communication connection. This way it is ensured that each individual voltage controller receives correct information and is not in any way dependent in the functionality of the other voltage regulator.

In one example embodiment, the alternator system further comprises a communication hardware-node connected to the communication connection of the main voltage regulator and to the communication connection of the redundant voltage regulator. By connecting the communication hardware-node to a communication connection of each voltage regulator it is ensured that each individual voltage controller receives correct information and is not in any way dependent in the functionality of the other voltage regulator.

Alternatively, the alternator system further comprises a main communication hardware-node connected to the communication connection of the main voltage regulator, and a redundant communication hardware-node connected to the communication connection of the redundant voltage regulator. By using an individual communication hardware-node connected to each voltage regulator the risk that a failure in a single communication hardware-node will influence the both voltage regulators is reduced.

Still more alternatively, the alternator system further comprises an alternator housing communication terminal connected to the communication connection of the main voltage regulator and to the communication connection of the redundant voltage regulator and configured for being connected to an external communication hardware-node. This way it is ensured that each individual voltage controller is independent of the correct functionality of the other voltage regulator for communication with the external communication hardware-node.

Still more alternatively, the alternator system further comprises an alternator housing main communication terminal connected to the communication connection of the main voltage regulator and configured for being connected to an external main hardware-node, and an alternator housing redundant communication terminal connected to the communication connection of the redundant voltage regulator and configured for being connected to an external redundant hardware-node. By using an individual communication hardware-node connected to each voltage regulator the risk that a failure in a single communication hardware-node will influence the both voltage regulators is reduced.

In one example embodiment, the alternator, the main voltage regulator and the redundant voltage regulator are located within single alternator housing. Thereby a compact and robust alternator system may be provided.

In one example embodiment, each of the main and redundant voltage regulators comprises a phase detection connection connected at an individual connection to an individual winding of the stator. Having individual and separate electrical connections and electrical conductors the risk that a single electrical connection failure or single electrical conductor failure will cause failure of both the main and redundant voltage regulators.

In one example embodiment, a first connection of the main power switch is connected to a main regulator voltage terminal of the alternator and a second connection of the main power switch is connected to the field coil on a positive field coil side, and wherein a first connection of the redundant power switch is connected to the field coil on a negative field coil side and a second connection of the redundant power switch is connected to the a ground connection or battery negative terminal of the alternator. Alternatively, the first connection of the redundant power switch is connected to a main regulator voltage terminal of the alternator and the second connection of the redundant power switch is connected to the field coil on a positive field coil side, and wherein the first connection of the main power switch is connected to the field coil on a negative field coil side and the second connection of the main power switch is connected to the ground connection or battery negative terminal of the alternator. The main power switch, the field coil and the redundant power switch are connected in series, in that order. However, the position of the main and redundant power switches before or after the field coil, as seen in a current direction, may be varied, according to the specific circumstances.

According to a further aspect of the present disclosure, there is provided a power supply for an electrical system comprising a battery connected to at least one load and the alternator system as described above, wherein a positive terminal of the battery is connected to a battery positive terminal of a housing of the alternator.

According to a further aspect of the present disclosure, there is provided a vehicle, in particular a road or off-road vehicle, such as an automobile, a truck or a bus, or an air vehicle or a marine vessel comprising a power supply as described above.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

The various example embodiments of the disclosure, including its particular features and example advantages, will be readily understood from the following illustrative and non-limiting detailed description and the accompanying drawings, in which.

DETAILED DESCRIPTION OF EXAMPLE EMBODIMENTS

Figure 1:
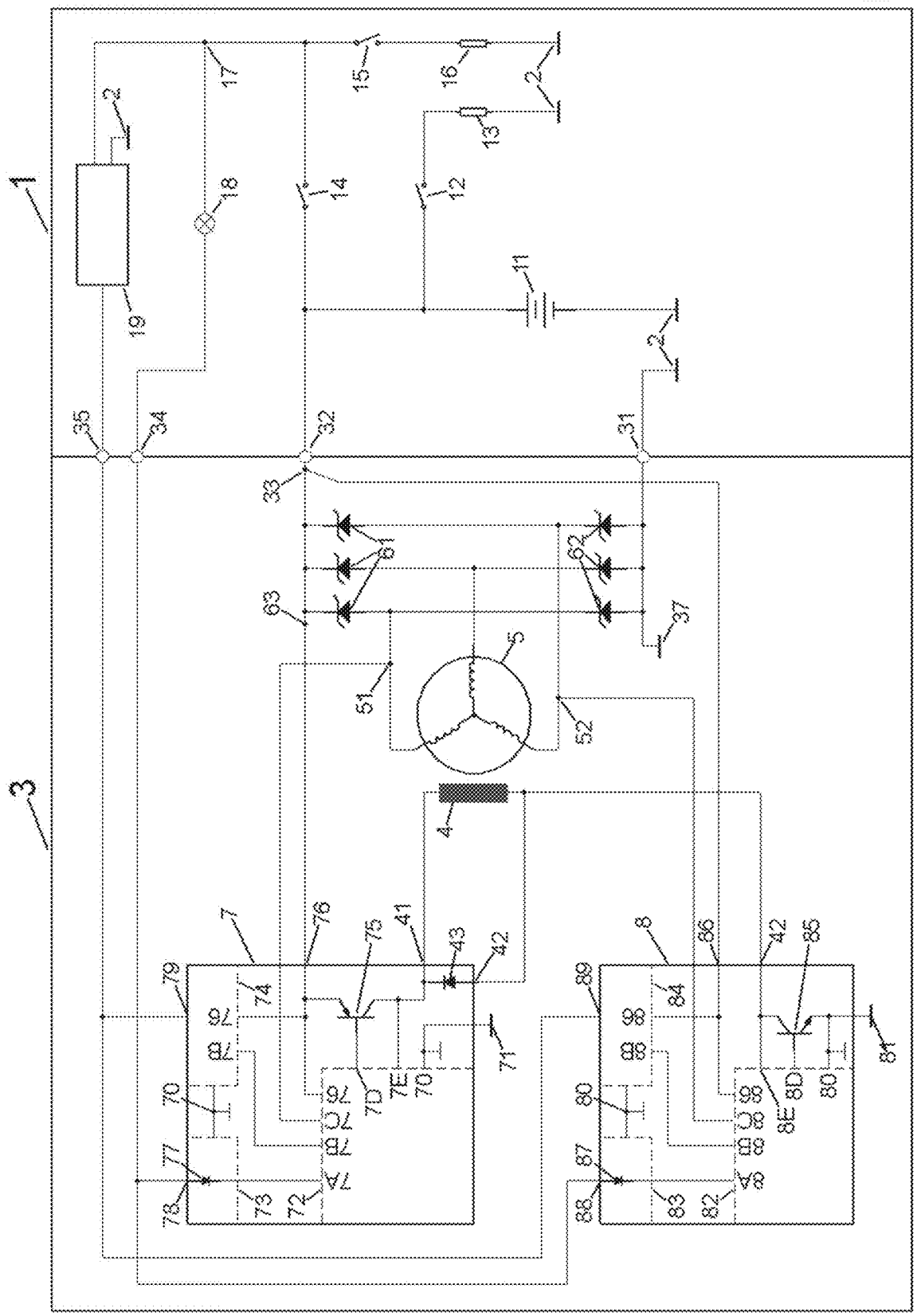
FIG. 1 schematically shows an example embodiment of a 12 or 24 volt alternator system.

FIG. 1 shows schematically an example embodiment of a vehicle electric system 1 principle with an electrical generator system 3, wherein the most common type of electrical generator for vehicles today is an alternator system 3. This is in fact a synchronous AC (Alternating Current) generator which is configured to supply a DC (Direct Current) output over the battery positive and negative terminal 32, 31 of either about 12 V (Volt) in cars or about 24 V in trucks and similar heavy-duty vehicles. A rotor of the alternator system 3 is normally driven by the vehicle internal combustion engine through a belt where the revolution speed is step-upped somewhere between 2-4 times.

Symbolically just a few electrical functions and electrical loads are illustrated in the vehicle electrical system 1 diagram. The illustrated electrical functions are limited to an electrical storage system in form of a 12 V or 24 V battery 11, an electrical switch 12 for switching on or off a high electrical loads 13, an additional load switch 15 that is placed in series with an ignition switch 14 and configured for switching on and off normal loads 16, a communication hardware node 19, such as for example a LIN (Local Interconnection Net) master node 19 and a charge error indicator lamp 18. Alternative communication systems that may be used are for example Flex Ray and CAN.

Basically the alternator system 3 is supplying high power output at relative low rotor revolution speeds with a capability of higher current output than required for both battery charging and electrical load energy consumption. The output voltage level of the alternator system 3 may be controlled by regulating a DC excitation current flowing through a field coil 4 of the rotor. The field coil may also be referred to as field excitation winding. The variable excitation current generates a variable magnetic field around the field coil 4, which magnetic field generates an AC current in each of the three-phase stator winding 5.

The three-phase stator windings 5 consequently jointly generate three-phase AC currents when the field coil 4 of the rotor is excited and driven to rotate. The AC currents are subsequently converted to DC current trough the positive Zenger rectifier diodes 61 and the negative Zenger rectifier diodes 62.

Although the disclosure shows a three-phase AC current there is no limit to the number of phases. The alternator according to the disclosure may equally be equipped with a 5-phase alternator, or any other number of phases. A 5-phase alternator is a little bit more expensive than a three-phase alternator, but an advantage with a 5-phase alternator is less ripple in the output voltage which could decrease the filtering needs in the other electrical components which slightly reduces the cost of them. Moreover, a wye-wound stator is shown in FIG. 1 but the disclosure is equally relevant for a delta-wound stator.

As illustrated in FIG. 1, regulated voltage and current is supplied by the alternator system 3 through the positive battery terminal 32 to the vehicle battery 1 that is grounded to its own connection 2. The alternator, the main voltage regulator 7 and the redundant voltage regulator 8 may preferably be located within single alternator housing for providing a compact and robust alternator system.

The battery 11 may for example be normally continuously charged except during a short activation of e.g. a starter motor or high load 13. Too low charging current can temporarily also occur when the revolution speed of the vehicle internal combustion engine is low and several electrical loads are consuming much power in total.

Moreover, the vehicle can control the alternator system 3 to for example temporarily lower the output voltage, such that battery charging is temporarily stopped, in order to lower CO2 emission and fuel consumption.

By regulating the alternator system output voltage to a fixed level, both the charging and the electrical load currents are limited. But if a failure occurs in the output voltage regulation, causing a too high exciting level of the field coil 4 of the rotor, the consequence is a too high output voltage level, which is also referred to as overvoltage. This can be devastating for both the battery 11 and all electrical loads with a high risk that they will malfunction or in the worst case be destroyed.

Therefore the ISO 16750-2 (International Organization for Standards) has a requirement for vehicles that all electrical components shall withstand for cars 18 V during 60 minutes. For trucks the requirement is 36 V for 60 minutes. However, the use of electrical components that can withstand significantly higher supply voltage levels, such as about 18-20 V, than a target operating supply voltage level of about 12-14 V, which is configured to be a normal operating supply voltage level, renders the cost for the electrical components high.

The alternator system according to the disclosure aim at removing the risk for overvoltage 10 completely, or at least reduce the risk for overvoltage to such an extent that it can be deemed non-existing. This would enable use of less costly electrical components that that can withstand lower supply voltage levels without a risk for malfunction or destruction.

The alternator system according to the disclosure solves the problem of overvoltage by providing the alternator system with a redundant voltage regulator 8.

As seen in FIG. 1 the alternator system 3 comprises an alternator with a stator having three stationary windings 5 and a rotor with a rotatable field coil 4 for producing alternating current, a main voltage regulator 7 having a main controller 72 and a main power switch 75 configured to control the current through the field coil 4, a redundant voltage regulator 8 having a redundant controller 82 and a redundant power switch 85 configured to control the current through the field coil 4, wherein the main power switch 75, the field coil 4 and the redundant power switch 85 are connected in series, in that order.

The main and redundant power switch 75, 85 may for example be power transistors, such as PNP or FET transistors.

Each of the main and redundant controllers 72, 82 may for example be implemented on a single IC (Integrated Circuit), for example in form of microprocessor or ASIC (Application Specific Integrated Circuit). Each controller 72, 82 in form of an IC may also be assembled together with respective power switch 75, 85 on a common substrate.

Each of the main and redundant controllers 72, 82 typically comprises at least a central processing unit, a memory, an ND converter and one or more input/output ports for communication with external electrical equipment/components, wherein the processing unit is configured to process input data received via the input ports according to instructions stored in the memory and provide results via the output ports.

As a result, information controlling for example the output voltage regulation set-point of each of the main and redundant controllers 72, 82 may be stored locally in the memory of each of said controllers 72, 82, such that the output voltage regulation set-point of each of the main and redundant controllers 72, 82 is largely handled independent of each other, thereby avoiding that corrupt or otherwise incorrect information controlling or setting the output voltage regulation set-point of the main controller 72 does not influence or affect control or setting of the output voltage regulation set-point of the redundant controller 82.

The redundant controller 82 is configured to control the redundant power switch 85 independent from the status or activity of the main controller 72 or main power switch 75. This means for example that the redundant controller 82 is configured to maintain the same predetermined control strategy and the same predetermined output voltage regulation set-point independently of the operating status, operating mode and activity of the main controller 72 or main power switch 75.

In other words, the redundant controller 82 will not change its predetermined operating mode, operating setting, control strategy or output voltage regulation set-point merely due to sudden operating failure or malfunction of the main controller 72 or main power switch 75, for example due to excess temperature, excess current or voltage, ionizing radiation, mechanical shock, stress or impact, open or short-circuiting, etc. Both the main and redundant controllers 72, 82 are thus configured to continuously operate separately and independently from each other for avoiding that any type of fault will negatively affect both the main and redundant voltage regulators 7, 8, thereby ensuring a high level of operating redundancy of the output voltage regulation of the alternator system.

A first connection of the main power switch 75 is connected to a main regulator voltage terminal 63 of the alternator and a second connection of the main power switch 75 is connected to the field coil 4 on a positive field coil side 41, and a first connection of the redundant power switch 85 is connected to the field coil 4 on a negative field coil side 42 and a second connection of the redundant power switch 85 is connected to a ground connection 81 or battery negative terminal 31 of the alternator system 3.

Consequently, the positive field coil side 41 is controlled by the main power switch 75 and the negative field coil side 42 is controlled by the redundant power switch 85. This configuration means that the regulator control of the main and the redundant voltage regulators 7, 8 are independent of each other.

As an alternative to the illustration in FIG. 1, the first connection of the redundant power switch 85 may be connected to the battery positive terminal 32 of the alternator and the second connection of the redundant power switch 85 may be connected to the positive field coil on the positive field coil side 41, and the first connection of the main power switch 75 may be connected to the field coil 4 on the negative field coil side 42 and the second connection of the main power switch 85 may be connected to the a ground connection 81 or battery negative terminal 37 of the alternator.

The redundant voltage regulator 8 may have an output voltage regulation set-point that is higher than an output voltage regulation set-point of the main voltage regulator 7.

By choosing a output voltage regulation set-point of the redundant regulator 8 that is about 0.3 V higher in a 12 V electrical system and about 0.5 V higher in a 24 V system, than the output voltage regulation set-point of the main regulator 7, the main regulator 7 is normally controlling the voltage output level at the battery positive terminal 32.

Specifically, the redundant voltage regulator 8 may have an output voltage regulation set-point that is in the range of 0.1-3.0 volt or 1-20%, specifically 0.1-1.0 volt or 1-7%, and more specifically 0.2-0.7 volt or 0.2-0.5% higher than an output voltage regulation set-point of the main voltage regulator 7.

The redundant voltage regulator 8 may have an individual connection to the charge error indicator lamp 18.

As long as there is no failure in the main regulator 7 the redundant regulator 8 is continuously 10 conducting simply because the redundant controller 82 reads an actual output voltage value that is lower than the set-point value of the redundant voltage regulator 8. This results in a saturated or fully conducting redundant power switch 85, in form of a power transistor.

Generally any kind of failure in the main voltage regulator 8 that causes a too high exciting level and consequently increased output voltage, will then automatically be limited by the redundant voltage regulator 7.

In other words, upon any type of failure of the alternator system that causes the main voltage regulator 8 to generate a current flow through the field coil 4 that results in too high exciting level and consequently an output voltage that reaches up to the slightly elevated output voltage regulation set-point of the redundant voltage regulator 7, compared with output voltage regulation set-point of the main voltage regulator 8, the redundant voltage regulator 7 will immediately and automatically take over active regulation of the current through the field coil 4 such that the actual output voltage of the alternator system equals the output voltage regulation set-point of the redundant voltage regulator 7. The output voltage of the alternator system will thereafter remain on a voltage level corresponding to the output voltage regulation set-point of the redundant voltage regulator 8, at least until repair of the alternator system.

Consequently, the output voltage of the alternator system will in case of failure of the main voltage regulator 7 merely rise from a voltage level corresponding to the output voltage regulation set-point of the main voltage regulator 7 to voltage level corresponding to the output voltage regulation set-point of the redundant voltage regulator 8. Thus, the output voltage of the alternator system will in case of failure of the main voltage regulator 7 not rise above a voltage level corresponding to the output voltage regulation set-point of the redundant voltage regulator 8.

One possible failures of the main voltage regulator is a bypassed or short-circuited main power switch 75, for example due to overheating or a wrong controller signal 7D from the main controller 72. This type of failure is solved by the redundant voltage regulator of the alternator system according to the present disclosure.

Another possible reason for incorrect controller signal 7D of the main controller 72 may be malfunctioning ground connection 71 of the main voltage regulator 7. There is an internal grounding Net 70 in the main regulator 7 connected to a suitable ground connection 71 in the alternator system, preferably to the casing of the alternator system. Also the redundant voltage regulator 8 has an internal grounding net 80 which is connected to an alternator ground connection 81, such as the alternator system casing. The ground connection 81 of the redundant voltage regulator 8 is preferably a standalone connection that is physically separate and displaced from the ground connection 71 of the main voltage regulator 7 for avoiding any common cause problem.

As disclosed in in FIG. 1 the battery negative terminal 31 of the alternator normally is connected internally to the metal case 37 which often is aluminum. In its turn it has a very good electrical conducting properties as well as cooling capabilities. In its turn the battery negative terminal 31 is connected to a vehicle body or chassis ground 2. Often a braid is used as a grounding connection between the battery negative terminal 31 and vehicle body or chassis ground 2.

Another possible reason for incorrect controller signal 7D of the main controller 72 may be malfunctioning power supply connection and/or output voltage sensing signal connection. A combined power supply and output voltage sensing signal of the main voltage regulator 7 may be provided via a voltage sense connection 76 that is connected to a main regulator voltage terminal 63, which shall be physical close and suitable for the main regulator 7. For avoiding common failure caused by failure of electrical connection at the main regulator voltage terminal 63, a redundant regulator voltage terminal 33 should be used for a combined power supply and output voltage sensing signal of the redundant voltage regulator 8. The redundant regulator voltage terminal 33 should be connected to a voltage sense connection 86 of the redundant voltage regulator 8, and the redundant regulator voltage terminal 33 should be physically separate and displaced from the main regulator voltage terminal 63. Moreover, the power supply connection and/or output voltage sensing signal connection 76 of the main regulator 7 should be connected to the main regulator voltage terminal 63 by an individual, separate and unique conductor, and the power supply connection and/or output voltage sensing signal connection 86 of the redundant regulator 8 should be connected to the redundant regulator voltage terminal 33 by another individual, separate and unique conductor. In that way, failure of the electrical conductor or the conductor's connections for power supply to the main regulator 7 will not negatively affect the functionality and operation of electrical conductor or the conductor's connections for power supply to the redundant regulator 8. Thereby the risk that a single electrical connection failure or single electrical conductor failure will cause failure of both the main and redundant voltage regulator is eliminated.

The voltage terminal 33 of the redundant voltage regulator 8 should preferably is located at, or within the same single-piece structural part as, the battery positive terminal 32 of the housing of the alternator. Thereby the risk that a damaged or otherwise poor electrical connection between the voltage terminal 33 of the redundant voltage regulator 8 and the battery positive terminal 32 of the housing of the alternator is eliminated. Thereby, the functionality of the redundant voltage regulator 8 is independent from the quality of the main regulator voltage terminal 63.

Main controller 72 and associated diagnostics electronics is configured to detect an AC voltage phase signal at a stator V-phase 51 via a main AC phase signal connection 7C of the main controller 72. The main AC phase signal is used and to detect the amplitude either for self-start based on the exciting eminence or for the AC frequency or alternator speed detection.

With the same functionality the redundant controller 82 and associated diagnostics electronics is configured to detect an AC voltage phase signal at a stator W-phase 52 via a second AC phase signal connection 8C of the redundant controller 72. It is important that two different phases V, W are connected so a single failure of any electrical connection or associated conductor does not cause a common failure in both regulators 7, 8.

In basic and cheaper alternators there are no LIN units and the driver is informed of a charging failure through the charge indicator lamp 8 via alternator terminal 34. The signal comes from respectively regulator 7, 8 from the controller and diagnostic electronics 72, 82 and internal signals 7A, 8A via the diode wired-or outputs 78, 88. The wired-or configuration is reached by the two diodes 77, 87 and it means that if already when just one regulator 7, 8 has a failure the charge indicator lamp 18 will be turned on. During start-up of the internal combustion engine the current through the lamp from ignition switch net 17 works to excite the alternator field coil 4.

Another possible common failure of the main and redundant voltage regulators 7, 8 may be failure of a common communication connection. This possible failure is solved by the alternator system of the present disclosure by providing each of main and redundant voltage regulators 7, 8 with an individual communication connection 79, 89.

The example embodiment alternator system 3 illustrated in FIG. 1 comprises an alternator housing communication terminal 35 connected to both the communication connection 79 of the main voltage regulator 7 and to the communication connection 89 of the redundant voltage regulator 8. An external communication hardware-node 19 is connected to an alternator housing communication terminal 35 for establishing communication with the main and redundant voltage regulators 7, 8.

The external communication hardware-node 19 may for example be a LIN master node 19 and each of the main and redundant voltage regulators 7, 8 may comprise a LIN slave node 74, 84 may that is connected to the LIN master node 19 via the main voltage regulator communication connection 79 and redundant voltage regulator communication connection 89.

Generally, communication to and from each individual communication connection 79, 89 of the main and redundant voltage regulators 7, 8 involves digital communication with the external communication hardware-node 19, such as for example by means of a serial communication protocol.

An advantageous feature of the alternator system according to the disclosure is that if the main voltage regulator 7 communicates detection of an error to an superordinate electrical controller, and the redundant voltage regulator automatically has taken over regulation of the output voltage of the alternator system 3 due to the higher the output voltage regulation set-point of the redundant voltage regulator 8, the superordinate electrical controller may respond by lowering the output voltage regulation set-point of the redundant voltage regulator 8 to the same set point value as the main voltage regulator 7 had before the failure occurred. The advantage of this approach is that the operation of the alternator system 3 can continue without increased risk or damages to any of the other electrical components, and that the alternator system 3 is fully functional.

An error message is preferably submitted to the driver, operator, fleet service management, service repair centre, etc., that service is needed, or the like. The communication between the main and redundant voltage regulators 7, 8 and the superordinate electrical controller is performed by means of the external communication node 19 and the communication nodes 74, 84 of each of the main and redundant voltage regulators 7, 8.

For diagnostics and plausibility purpose each voltage regulator 7, 8 may have a diagnostic feedback connection 7E, 8E via which the duty-cycle of each regulator can be detected and possibly forwarded via the LIN slave nodes 74, 84 to a superordinate ECU for providing a power load status of the alternator.

A fly-back or freewheel diode 43 is preferably provided between the positive and negative winding side 41, 42 of the rotor coil 4. The diode 43 is preferably located integrated in the main voltage regulator 7.

The disclosure above primarily relates to an AC generator. However in elderly and low-cost cars DC generators have been used. They included carbon brushes and quite often an electromechanical regulator for controlling the current through the exciting rotor coil to get a stable output voltage level.

Figure 2:
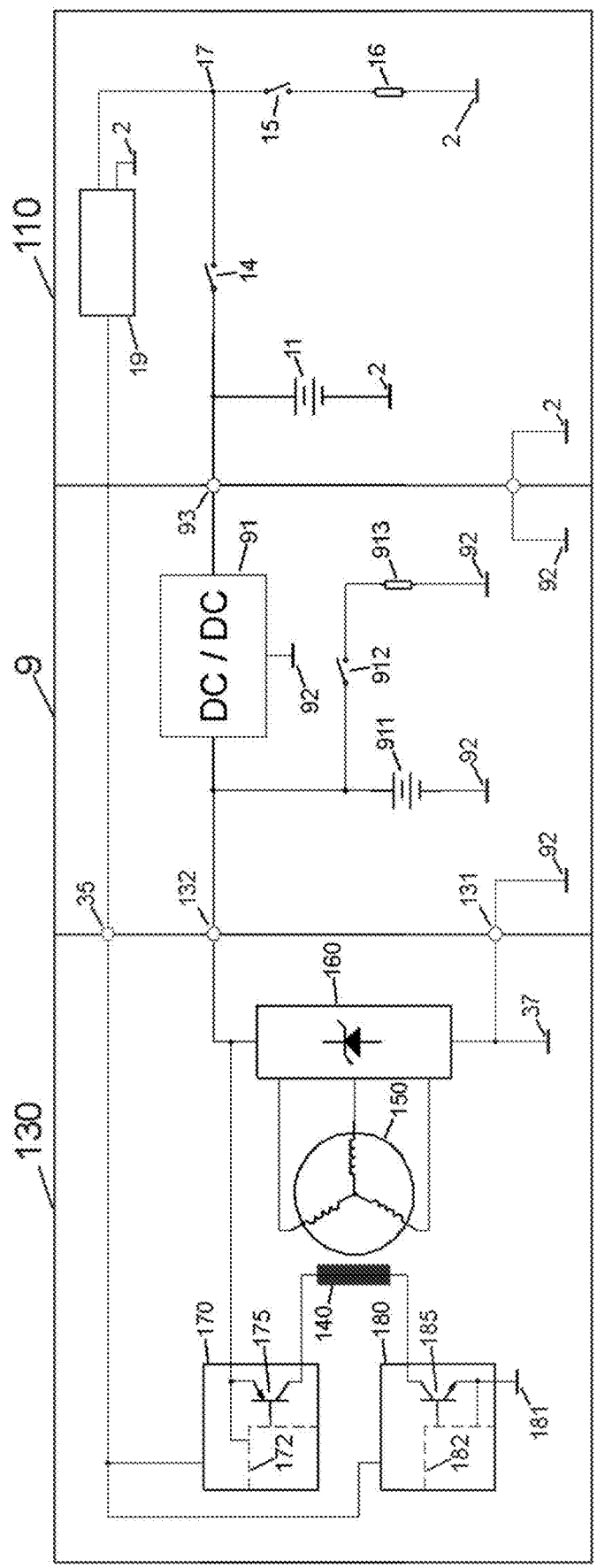
FIG. 2 schematically shows an example embodiment of a high voltage alternator system connected with a combined high voltage and low voltage electrical system.

FIG. 2 schematically discloses an example embodiment of a high voltage alternator system 130 connected with a combined high voltage and low voltage electrical system 9, 110, for example for a vehicle.

The high voltage alternator system 130 has an exciting field coil 140 in combination with main and redundant voltage regulators 170, 180 that are configured to provide a regulated high voltage output to the high voltage electrical system 9. The high voltage electrical system 9 is also connected to the low voltage electrical system 110 via a DC/DC converter 91.

The specific voltage levels of the high and low voltage electrical systems 9, 110 may be selected according to the specific requirements of the desired application. The voltage level of the high voltage electrical system 9 may be an integer multiple of the low voltage electrical system 110.

Specifically, the high voltage electrical system 9 may be a 48 V system and the low voltage electrical system 110 may be a 12 V system. The voltage output of the high voltage alternator system 130 may be about 48 V, and possibly up to a maximum charging voltage of about 52 V.

The low voltage electrical system 110 may alternatively be 24 V electrical system, thereby making it specifically suitable for a truck electrical system.

In the following description an example embodiment of the disclosure is described where the high voltage alternator system 130 and high voltage electrical system 9 are 48 V systems and the low voltage electrical system 110 is a 12 V system. However, the high voltage alternator system 130, high voltage electrical system 9 and low voltage electrical system 110 according to the disclosure is equally applicable to other voltage levels.

The 48 V alternator system 130 combined with the hybrid 48 V and 12 V electrical systems 9, 110 has the advantage of being able to provide 48 V supply to high power electrical loads, such that smaller electrical currents must be conducted through the electrical conductors. The power P equals the voltage U times the current U (P=U*I). Hence, by increasing the supplied voltage level the supplied current level may be equally reduced while keeping the power at the same level. Smaller electrical currents enable use of smaller and less costly and lighter-weight electrical conductors.

The combined 48 V and 21 V electrical systems 8, 110 of FIG. 2 may for example advantageously be applied in cars to meet lower $CO_2$ omission level requirements in coming years.

The 48 V electrical system of FIG. 2 may for example be used for supplying power to high power loads 913, like a starter motor of a combustion engine. Using a 48 V starter motor of equal power as in a 12 V system will lower the electrical current consumption with four times. This means that a wiring harness area reduction could be done with the same factor which leads to less copper and lower weight for both wires and electrical motors. Another advantage is that the efficiency is increased in both the wiring and electrical components itself.

Further examples of high load electrical components are an electrical A/C compressor (Air Condition), PTC climate theater (Positive Temperature Coefficient element), front window heating, engine cooling fan, etc.

The ground connection 92 of the 48 V electrical system 9 is preferably not connected to the same physical ground screw at body or chassis as the ground connection 2 of the 12 V electrical system 110. Electrically they will have substantially the same ground potential but by avoiding using a common ground connection a failure in any of the 48 V electrical system 9 or 12 V electrical system 110 will not influence each other.

As seen in FIG. 2 there are two batteries: a low voltage battery 11, such as a conventional 12 or 24 V battery; and a 48 V battery 911. The 48 V battery 911 is preferably of Lithium-Ion type and the low voltage battery 11 may be of a traditional lead-acid type.

Transfer of electrical power is done by the DC/DC converter 91 from the 48 V electrical system 9 to the 12 V electrical system 110. The 48 V electrical system 9 further comprises a 12 V positive terminal 93.

Since the 48 V alternator system 130 is connected to the 48 V electrical system 9 the previously described overvoltage problem only applies to the 48 V electrical system 9, and the electrical loads 913 connected thereto. Overvoltage from the 48 V alternator system 130 may be prevented from entering the 12 V electrical system 110 by means of the DC/DC converter 91.

In the same way as for the 12 V system 1 disclosed with reference to FIG. 1, the 48 V alternator system 130 comprises a redundant voltage regulator 180 that will automatically take over control of the current flowing through the field coil 140, and thus also the exciting field of the rotor, if a failure renders the main voltage regulator 170 to generate a too high exciting field.

In the same way as for a 12 V alternator system 3 describe above with reference to FIG. 1, the exciting field level is normally regulated by the main power switch 175, which is controlled by the main controller 172. An internal shortage of the transistor 175 or faulty electronics or any other problem described above with reference to FIG. 1, or the like, could result in too high exciting level, such that an overvoltage is supplied at the 48 V battery positive terminal 132.

The power switch 185 of the redundant voltage regulator 180 is normally continuously conducting as long as the output voltage of the 48 V alternator system lies at the output voltage regulation set-point of the main voltage regulator 170, because the output voltage regulation set-point of the redundant voltage regulator 180 is about 0.8 V higher than the output voltage regulation set-point of the main voltage regulator 170. Consequently, as soon as actual output voltage of the 48 V alternator system exceeds the output voltage regulation set-point of the main voltage regulator 170 with 0.8 V the redundant voltage regulator controller 180 automatically takes over the voltage output regulation, such that potentially harmful overvoltage practically never occurs.

In order to avoid that a single failure influences the functionality of both the main and redundant voltage regulators 170, 180, the same measures as described in the embodiment above with reference to FIG. 1 may be adopted also in this embodiment. In particular, the ground connection 181 of the redundant voltage regulator 180 is preferably a standalone connection that is separate and displaced from the ground connection of the main voltage regulator 170, the redundant regulator voltage terminal (not showed in FIG. 2) should be connected to a voltage sense connection of the redundant voltage regulator 180 and the redundant regulator voltage terminal should be separate and displaced from the main regulator voltage terminal, the voltage terminal (not showed) of the redundant voltage regulator 180 should preferably is located at, or within the same single-piece structural part as, the battery positive terminal 132 of the housing of the alternator, the main controller 172 and redundant controller 182 are configured to detect an AC voltage phase signal at individual stator phases wherein it is important that two different phases are connected, and each of main and redundant voltage regulators 170, 180 is provided with an individual communication connection.

The output voltage supplied at the 48 V battery positive terminal 132 is also here generated through the rotating field coil 140 and associated excitation level and by the AC generated in the 3-phase stator windings 150 and subsequently converted to DC in the rectifier unit 160. Note that the Zener voltage level of each individual rectifier must be adapted to the 48 V system 9 which means a so called Zener knee somewhere in the range of 60 to 70 V.

Grounding of the rectifier unit 160 is preferably done to the casing at an individual internal grounding 37 which in its turn is connected to the battery negative terminal 131 output.

In the 48 V system 9 a high load switch 912 need to have further electrical isolation and more robust connector housings compared to the 12 V system. So in the 12 V system 1 most loads 16 and complex ECUs remain there as well as the ignition switch 14 and most other electrical functions.

Furthermore, the LIN master node 19 in a 48 V/12 V system 110 is supplied in the same way as in a 12 V system 1. It communicates or is signaling through the alternator housing communication terminal 35 to or from the alternator system 130.

Reference signs mentioned in the claims should not be seen as limiting the extent of the matter protected by the claims, and their sole function is to make claims easier to understand.

The use of the word "a" or "an" in the specification may mean "one," but it is also consistent with the meaning of "one or more" or "at least one." The term "about" means, in general, the stated value plus or minus 10%, or more specifically plus or minus 5%. The use of the term "or" in the claims is used to mean "and/or" unless explicitly indicated to refer to alternatives only.

The terms "comprise", "comprises" "comprising", "have", "has", "having", "include", "includes", "including" are open-ended linking verbs. As a result, a method or device that "comprises", "has" or "includes" for example one or more steps or elements, possesses those one or more steps or elements, but is not limited to possessing only those one or more elements.

The alternator system of the present disclosure may be embodied in other specific forms without departing from its spirit or essential characteristics. It is appreciated that various features of the above-described examples can be mixed and matched to form a variety of other alternatives. As such, the described embodiments are to be considered in all respects only as illustrative and not restrictive. The scope of the disclosure is, therefore, indicated by the appended claims rather than by the foregoing description. All changes that come within the meaning and range of equivalency of the claims are to be included within their scope.

REFERENCE LIST

1 Principle of a vehicle electrical system
2 Ground connections to vehicle body or chassis
3 Alternator
4 Field coil
5 3-phase stator windings
7 Main regulator
8 Second regulator
9 48 V system in a 12/48 V system
11 Battery
12 Switch for high load
13 High load, e.g. starter motor
14 Ignition switch
15 Additional load switch
16 Normal electrical load
17 Ignition switch net
18 Charge indicator lamp
19 LIN master node
31 Battery negative terminal
32 Battery positive terminal
33 Redundant regulator voltage terminal
34 Charge indicator lamp terminal
35 Alternator communication terminal
37 Internal grounding to case
41 Positive field coil side and main regulator output
42 Negative field coil side and second regulator output
43 Fly-back or freewheel diode
51 Main AC phase connection, (e.g. V)
52 A second AC phase connection, (e.g. W)
61 Positive Zener rectifier diodes
62 Negative Zener rectifier diodes
63 Main regulator voltage terminal
70 Internal ground connections
71 Ground connection
72 Main controller
74 LIN slave node
75 Main power switch
76 Power supply and voltage sense connection
77 Diode wired-or output
78 Main indicator output
79 Main voltage regulator communication connection
7A Internal indicator signal connection
7B Internal communication signal connection
7C Main AC phase signal connection
7D Controller signal output connection to power transistor
7E Diagnostic feed-back connection of regulator output
80 Internal ground connection
81 Ground connection, separately
82 Redundant controller with diagnostics
84 LIN slave node
85 Redundant power switch
86 Power supply and voltage sense connection
87 Diode wired-or output
88 Second indicator output
89 Redundant voltage regulator communication connection
8A Internal indicator signal connection
8B Internal communication signal connection
8C Second AC phase signal connection
8D Controller signal output connection to power transistor
8E Diagnostic feed-back connection of regulator output
91 DC/DC converter between the 48 V and 12 V system
92 V ground connections to vehicle body or chassis
93 12 V positive terminal
110 12 V system in a 12/48 V system
119 LIN master node or charge indicator lamp
130 48 V alternator system
131 48 V battery negative terminal
132 48 V battery positive terminal
136 Communication bus or charge indicator lamp terminal
140 48 V field coil
150 48 V stator windings
160 Zener rectifier diode unit
170 48 V main regulator
172 Controller with diagnostics 175 Power switch, PNP or FET transistor
180 48 V redundant regulator
181 Ground connection, separately
182 Controller with diagnostics
185 Power switch, NPN or FET transistor
911 High voltage battery
912 Switch for a high electrical load
913 High electrical load

What is claimed is:

1. An alternator system comprising:
an alternator with a stator having at least one stationary winding and a rotor with a rotatable field coil for producing alternating current;
a main voltage regulator having a main controller and a main power switch configured to control the current through the field coil; and
a redundant voltage regulator having a redundant controller and a redundant power switch configured to control the current through the field coil;
wherein the main power switch, the field coil and the redundant power switch are connected in series, in that order,
wherein the redundant controller is configured to control the redundant power switch independent from the status or activity of the main controller or main power switch; and
wherein an electrical ground connection of the main voltage regulator is physically separate and physically displaced from an electrical ground connection of the redundant voltage regulator.

2. The alternator system according to claim 1, wherein the redundant voltage regulator has an output voltage regulation set-point that is higher than an output voltage regulation set-point of the main voltage regulator.

3. The alternator system according to claim 1, wherein the redundant voltage regulator has an output voltage regulation set-point that is in the range of one of 0.1-3.0 volts or 1-20 percent higher than an output voltage regulation set-point of the main voltage regulator.

4. The alternator system according to claim 1, wherein both the main and redundant voltage regulators are configured for being in operation simultaneously in normal operation of the alternator system, wherein as long as the main voltage regulator is fully functional, the redundant power switch is controlled to be in a conducting state because output voltage of the alternator system is lower than the predetermined output voltage regulation set-point of the redundant voltage regulator, and wherein the redundant voltage regulator automatically takes over control of the output voltage of the alternator system according to output voltage regulation set-point of the redundant voltage regulator when the main voltage regulator over-excites the field coil due to a failure.

5. The alternator system according to claim 1, wherein a voltage terminal of the main voltage regulator is separate and displaced from a voltage terminal of the redundant voltage regulator.

6. The alternator system according to claim 1, wherein a voltage terminal of the redundant voltage regulator is located at, or within the same single-piece structural part as, a battery positive terminal of a housing of the alternator.

7. The alternator system according to claim 1, wherein each of main and redundant voltage regulators comprise an individual communication connection.

8. The alternator system according to claim 7, wherein the alternator system further comprises a communication hardware-node connected to the communication connection of the main voltage regulator and to the communication connection of the redundant voltage regulator; or
a main communication hardware-node connected to the communication connection of the main voltage regulator, and a redundant communication hardware-node connected to the communication connection of the redundant voltage regulator; or
an alternator housing communication terminal connected to the communication connection of the main voltage regulator and to the communication connection of the redundant voltage regulator and configured for being connected to an external communication hardware-node; or
an alternator housing main communication terminal connected to the communication connection of the main voltage regulator and configured for being connected to an external main hardware-node, and an alternator housing redundant communication terminal connected to the communication connection of the redundant voltage regulator and configured for being connected to an external redundant hardware-node.

9. The alternator system according to claim 1, wherein the alternator, the main voltage regulator and the redundant voltage regulator are located within single alternator housing.

10. The alternator system according to claim 1, wherein each of the main and redundant voltage regulators comprises a phase detection connection connected at an individual connection to an individual winding of the stator.

11. The alternator system according to claim 1, wherein
a first connection of the main power switch is connected to a battery positive terminal of the alternator and a second connection of the main power switch is connected to the field coil on a positive field coil side, and wherein a first connection of the redundant power switch is connected to the field coil on a negative field coil side and a second connection of the redundant power switch is connected to a ground connection or battery negative terminal of the alternator; or
wherein a first connection of the redundant power switch is connected to a battery positive terminal of the alternator and a second connection of the redundant power switch is connected to a the field coil on a positive field coil side, and wherein a first connection of the main power switch is connected to the field coil on a negative field coil side and a second connection of the main power switch is connected to the a ground connection or battery negative terminal of the alternator.

12. A power supply for an electrical system comprising a battery connected to at least one load and the alternator system according to claim 1, wherein a positive terminal of the battery is connected to a battery positive terminal of a housing of the alternator.

13. A vehicle, being a land vehicle, an air vehicle or a marine vessel, comprising the power supply according to claim 12.

14. A power supply according to claim 12, wherein the alternator system is connected with a combined high voltage and low voltage electrical system for a vehicle, wherein the alternator system is configured to provide a regulated high voltage output to the high voltage electrical system, and wherein the high voltage electrical system is connected to the low voltage electrical system via a DC/DC converter.

15. A power supply according to claim 14, wherein a ground connection of the high voltage electrical system is not connected to the same physical ground screw at body or chassis as the ground connection of the low voltage electrical system.

16. The alternator system according to claim 1, wherein the electrical ground connection of the main voltage regulator and the electrical ground connection of the redundant voltage regulator are physically made at different locations on a casing of the alternator system.

* * * * *